United States Patent [19]

Wang

[11] Patent Number: 5,289,464
[45] Date of Patent: Feb. 22, 1994

[54] FREQUENCY-MULTIPLEXED CELLULAR TELEPHONE CELL SITE BASE STATION AND METHOD OF OPERATING THE SAME

[75] Inventor: Robert C. Wang, Mendham, N.J.

[73] Assignee: AT&T Bell Laboratories, Murray Hill, N.J.

[21] Appl. No.: 947,696

[22] Filed: Sep. 21, 1992

[51] Int. Cl.$^5$ ............................................. H04J 1/14
[52] U.S. Cl. ..................................... 370/69.1; 370/76; 375/38
[58] Field of Search ...................... 375/38, 48, 17, 39; 370/76, 69.1, 123, 122

[56] References Cited

U.S. PATENT DOCUMENTS

| | | | |
|---|---|---|---|
| 4,513,412 | 4/1985 | Cox | 370/29 |
| 4,670,899 | 6/1987 | Brody et al. | 370/60 |
| 4,675,863 | 6/1987 | Paneth et al. | 370/50 |
| 4,903,125 | 2/1990 | Parker | 375/38 |
| 5,001,742 | 3/1991 | Wang | 379/60 |
| 5,084,903 | 1/1992 | McNamara et al. | 370/69.1 |
| 5,134,633 | 7/1992 | Werner | 375/38 |
| 5,170,413 | 12/1992 | Hess et al. | 370/69.1 |

OTHER PUBLICATIONS

J. Decaluwe, J. M. Rabaey, J. L. Van Meerbergen, and H. J. De Man, "Interprocessor Communication in Synchronous Multiprocessor Digital Signal Processing Chips," *IEEE Transactions on Acoustics, Speech, and Signal Processing*, vol. 37, No. 12, Dec. 1989, pp. 1816-1828.

J. G. Proakis and D. G. Manolakis, *Introduction to Digital Signal Processing*, Macmillan, New York 1988, pp. 395-400 and 795-848.

*IEEE Standard Dictionary of Electrical and Electronics Terms*, 1984, p. 82.

R. E. Crochiere and L. E. Rabiner, *Multirate Digital Signal Processing*, Prentice-Hall, 1983, Ch. 7, pp. 289-310.

G. A. Arredondo, J. C. Feggeler, and J. I. Smith, *The Bell System Technical Journal*, vol. 58, pp. 97-122 (Jan. 1979).

N. Ehrlich, R. E. Fisher, and T. K. Wingard, *The Bell System Technical Journal*, vol. 58, pp. 153-199 (Jan. 1979).

W. C. Jakes, *Microwave Mobile Communications*, Wiley, New York, 1974, pp. 172-173.

"Multirate Techniques in Filter Bank and Spectrum Analyzers and Synthesizers" in Multirate Digital Signal Processing by R. Grochiere et al. Prenctice Hall, Inc. 1983.

*Primary Examiner*—Benedict V. Safourek
*Assistant Examiner*—Ajit Patel
*Attorney, Agent, or Firm*—Robert B. Levy

[57] ABSTRACT

The present invention is directed to a cellular telephone cell site base station (10) having a single radio transmitter (40) and radio receiver (14) for transmitting and receiving, respectively, multiplexed frequency-modulated (FM) signals. A filter bank synthesizer (36), associated with the transmitter, multiplexes individual signals for transmission by the transmitter by exponentially modulating the signals to higher frequency bands followed by low-pass filtering and interpolation using discrete Fourier transform techniques. A filter bank analyzer (18), associated with the receiver, demultiplexes multiplexed FM signals received by the receiver by exponentially modulating each signal to its original spectral position followed by low-pass filtering and decimation, using discrete Fourier transform techniques.

17 Claims, 2 Drawing Sheets

FREQUENCY-MULTIPLEXED CELLULAR TELEPHONE CELL SITE BASE STATION AND METHOD OF OPERATING THE SAME

TECHNICAL FIELD

This invention relates to a cellular telephone cell site base station for transmitting and receiving frequency-multiplexed signals using a single transmitter and receiver, respectively.

BACKGROUND OF THE INVENTION

Cellular telephony is based on the concept of dividing a geographical area into a plurality of individual sub-areas or "cells." Situated within each cell is a base station containing at least one receiver and transmitter tuned to a particular frequency (channel) for communicating with a mobile transceiver (i.e., terminal), also tuned to receive and transmit on that channel. In actuality, the receive and transmit portions of the channel are spaced 45 MHz apart. Typically, the mobile terminal is carried in a vehicle in transit within that cell. As the vehicle containing the mobile terminal travels from one cell into another, the call between the mobile terminal and the cell site base station is transferred to a base station of the new cell. Typically, the new cell site base station has its receiver and transmitter tuned to a different channel, necessitating that the mobile terminal change its reception and transmission channel as well. The purpose in assigning a different channel to adjacent cells is to allow distant cells to use the same channel, thereby increasing the effective number of channels.

To facilitate more than a single call within each cell, a cell site base station must have the ability to receive and transmit calls on different channels. At the present time, such a capability is obtained by providing the cell site with multiple transmitter-receiver pairs, each tuned to a particular channel. The disadvantage of this approach is that the cost of providing such equipment rises in direct proportion to the number of channels to be offered. Moreover, each receiver-transmitter pair occupies a certain amount of physical space which is often at a premium within the cell site itself.

Thus, there is a need for a cellular telephone system which can transmit and receive multiple channel using a single transmitter and receiver pair.

SUMMARY OF THE INVENTION

Briefly, in accordance with a preferred embodiment of the invention, there is provided a cellular telephone cell site base station for transmitting and receiving frequency-multiplexed signals. The cell site base station has a receiver section that includes a single receiver capable of receiving a frequency-multiplexed signal, the signal having K signal components (channels), where K is an integer, each channel typically being transmitted by a separate mobile terminal. Signal processing means are coupled to the receiver for first converting the analog signal into digital samples and then converting the digitized, frequency-multiplexed signal samples into K individual base-band channels by digitally, exponentially modulating the individual base-band signal components followed by low-pass filtering and decimation. Each of the K individual base-band frequency signal channels is then demodulated, in accordance with the manner in which the channel had been originally modulated, to yield a separate voice signal for transmission to a land-based telephone network.

The cell site base station also has a transmitter section for transmitting a frequency-multiplexed signal containing K base-band channels, each intended for reception by a separate mobile terminal. The transmitter section includes K individual modulators, each serving to modulate a voice signal in a particular format (FM, TDMA, etc.). The outputs of the individual modulators are input to a second digital signal-processing means which serves to digitally, exponentially modulate the individually modulated channels from the modulators, then low-pass filter, interpolate and sum the channels to yield a frequency-multiplexed signal having K separate channels. The frequency-multiplexed signal is then input to a transmitter which has the capability of transmitting such a signal for reception by separate mobile terminals.

DETAILED DESCRIPTION

Figure 1:
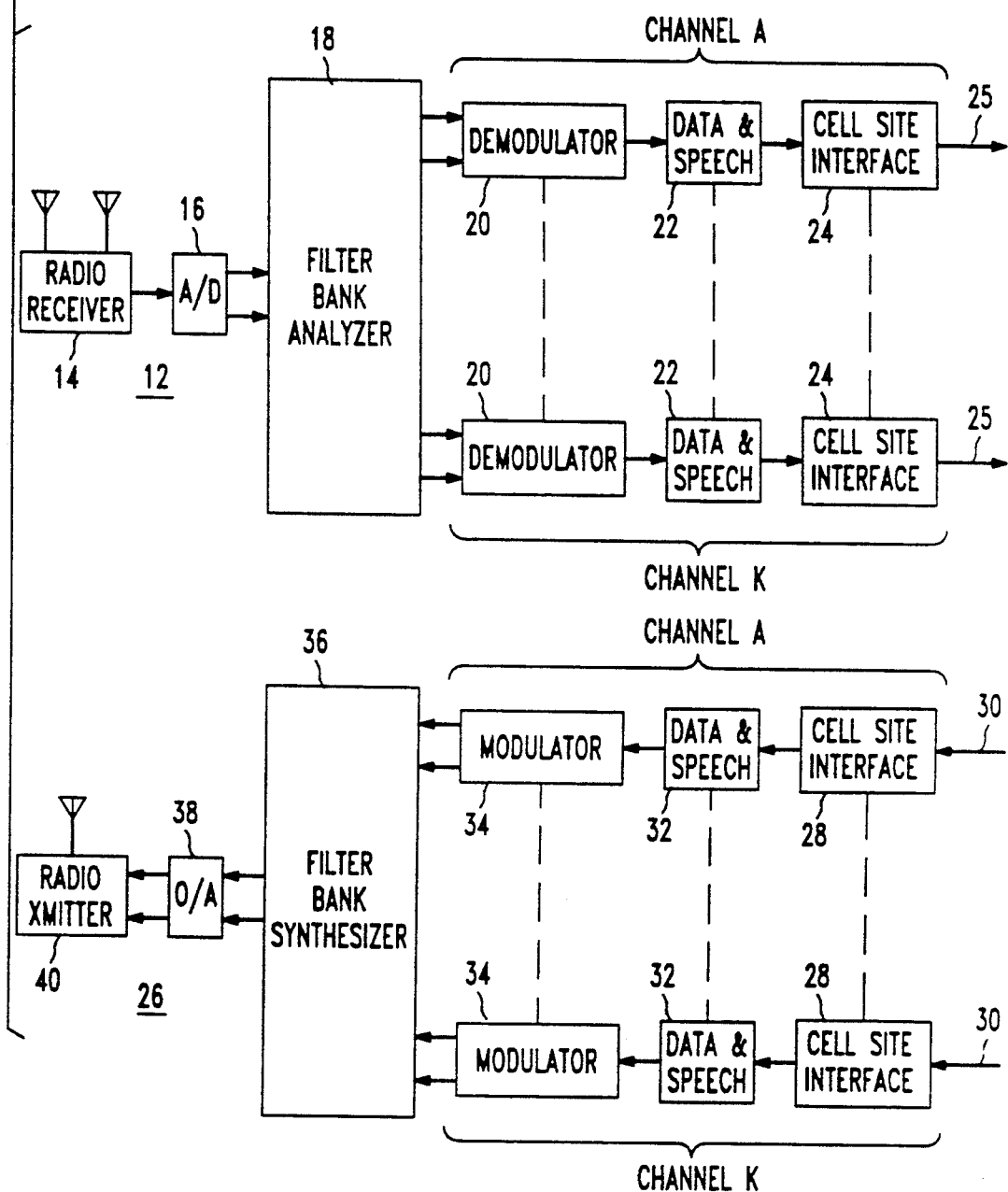
FIG. 1 is a block schematic diagram of a cellular telephone cell site base station in accordance with the invention.

FIG. 1 is a block schematic diagram of a cellular telephone cell site base station 10 for transmitting and receiving a frequency-multiplexed base-band signal in accordance with the invention. However, as will be appreciated from the following discussion, the invention may be equally useful for other types of radio transceiver systems. The base station 10 is comprised of a receiver section 12 for receiving a frequency-multiplexed signal comprised of K individual base-band signals (channels) where K is an integer. Typically, each individual base-band channel within the multiplexed signal received by the receiver section 12 is transmitted by a separate one of a plurality of mobile cellular telephone terminals (not shown). In practice, the channels in the frequency-multiplexed signal are spaced 30 kHz apart although other spacings could be used. The receiver section 12 comprises a radio receiver 14 which has the capability of receiving the K-channel, frequency-multiplexed signal.

The radio receiver 14 receives the frequency-multiplexed signal at Radio Frequency (RF) and, in response, generates an analog frequency-multiplexed signal at a baseband frequency. The output signal from the receiver 14 is supplied to an analog-to-digital conversion device 16 which converts the analog signal from the receiver 14 into a digital signal that is input to a filter bank analyzer 18. As will be described with respect to FIG. 2, the frequency bank analyzer 18 exponentially modulates the digital signal, then low-pass filters and decimates such signals to yield K complex signals, each corresponding to a particular channel transmitted by an individual mobile terminal.

Each of the K complex signals produced by the frequency bank analyzer 18 is supplied to a separate one of K demodulation channels 1,2 ... K. Each demodulation channel includes a demodulator 20 for demodulating the signal supplied to it in accordance with the manner in which the signal was modulated. When the received signal is frequency modulated, each of the K channels of the frequency-multiplexed signal received at the demodulator 20 is constructed to demodulate such an FM signal by computing the angle difference ($\tan^{-1}(I/Q)$), where I and Q are the angles of the in-phase and quadrature phase components of the channelized signal, respectively. Alternatively, the originally received frequency-modulated signal may be time-division modulated (TDMA), in which case each demodulator 20 is configured to demodulate such TDMA signals.

Still referring to FIG. 1, each of the K demodulation channels also includes a data and speech circuit for processing the output signal produced by the demodulator 20 to enhance the voice (or data) portion of the signal. Typically, the data and speech circuit 22 includes a digital signal processor (not shown). The manner in which the data and speech circuit 22 processes the output signal of the demodulator depends on the manner in which the demodulator 22 demodulates the signal input to it.

In the case where the demodulator 22 receives an FM signal, the data and speech circuit 22 processes the demodulator output signal by performing the following operations thereon: (1) high pass filtering, (2) decimation with low-pass filtering, (3) expansion, and (4) de-emphasis. Such processing steps are further described in my U.S. Pat. No. 5,001,742, issued Mar. 19, 1991, and assigned to AT&T Bell Laboratories, such patent herein incorporated by reference.

In practice, each separate one of the K channels of the K channels of the originally received, frequency-multiplexed signal has a Supervisory Audio Tone (SAT) signal imposed thereon by a separate mobile terminal for the purpose of establishing whether the terminal is in contact with the cell site base station 10. For this reason, each data and speech circuit 22 is also provided with the capability of processing the SAT signal superimposed on incoming channel in the manner disclosed in my aforementioned U.S. Pat. No. 5,001,742. The output signal of the data and speech circuit 22 is input to a cell site trunk interface circuit 24, as are known in the art, which serves to interface the data and speech circuit output signal (which is either a voice or data signal) for input to an outgoing telephone trunk line 25.

In the case where the signal input to the demodulator 20 is TDMA modulated, the data and speech circuit 22 serves to perform the steps of channel decoding and then speech decoding in a well-known manner.

In addition to the receiver section 12 thus described, the cell site base station 10 of the present invention also includes a transmitter section 26 which, as will be described, operates to frequency-multiplex K individual voice signals and to transmit such a frequency-multiplexed signal containing the K individual channels to one or more mobile terminals. The transmitter section 26 comprises K separate modulation channels 1,2...K, each including a cell site interface circuit 28, similar to the circuit 24, for interfacing the modulation channel to an incoming telephone trunk line 30 which carries an incoming voice or data signal. The interface circuit 28 of each modulation channel is coupled to a data and speech circuit 32, typically comprised of a digital signal processor (not shown).

Each data and speech circuit 32 serves to process the incoming voice or data signal from the cell site interface circuit 28 depending on the manner in which the signal is to be modulated for ultimate transmission. In the case where signals are to be frequency modulated, then, the data and speech circuit 28 processes the incoming voice or data signal by performing the following steps: (1) high-pass filtering, (2) compression, (3) pre-emphasis, (4) limiting the signal, and (5) interpolating and low-pass filtering the signal. For a further description of the manner in which such steps are carried out, reference should be had to my aforementioned U.S. Pat. No. 5,001,742, herein incorporated by reference.

As indicated earlier, it is desirable for each mobile terminal in communication with the cell site 10 base station to superimpose an SAT signal on the voice or data signal it transmits. By the same token, it is desirable for the cell site base station 10 to superimpose an SAT signal on each channel transmitted to a particular mobile terminal. Accordingly, each data and speech circuit 32 is provided with the capability of superimposing an SAT signal on the voice or data signal processed thereby in the manner described in my aforementioned U.S. Pat. No. 5,001,742.

If the signal ultimately to be transmitted is to be modulated in a different manner, then the manner in which the data and speech circuit 32 processes the incoming voice or data signal will be different. When the signal input to the data and speech circuit 32 is to be subsequently TDMA modulated, then the data and speech circuit first codes the incoming voice (or data) signal and thereafter codes the channel in a well-known manner.

The output of the data and speech circuit 32 of each modulation channel is input to a modulator 34 designed to modulate the signal in a particular format, say FM or TDMA, depending on the manner in which the signal supplied from the data and speech circuit had been processed. The signals from the modulators 34 of the modulation channels are input to a filter bank synthesizer 36. As will be better described with respect to FIG. 3, the filter bank synthesizer 36 serves to exponentially modulate the individual signals from the modulators 34, followed by low-pass filtering, interpolation and summing, to yield a K-channel frequency-multiplexed signal having digitized in-phase and quadrature phase components. A digital-to-analog conversion device 38 (typically comprised of a pair of D/A converters) serves to convert the digital in-phase and quadrature phase components of the frequency bank synthesizer 36 output signal into a corresponding pair of analog signals which are input to a radio transmitter 40. The transmitter 40 combines the analog in-phase and quadrature-phase components of the synthesized K-channel frequency-multiplexed signal and then transmits the combined signals for reception by one or more mobile terminals (not shown).

Figure 2:
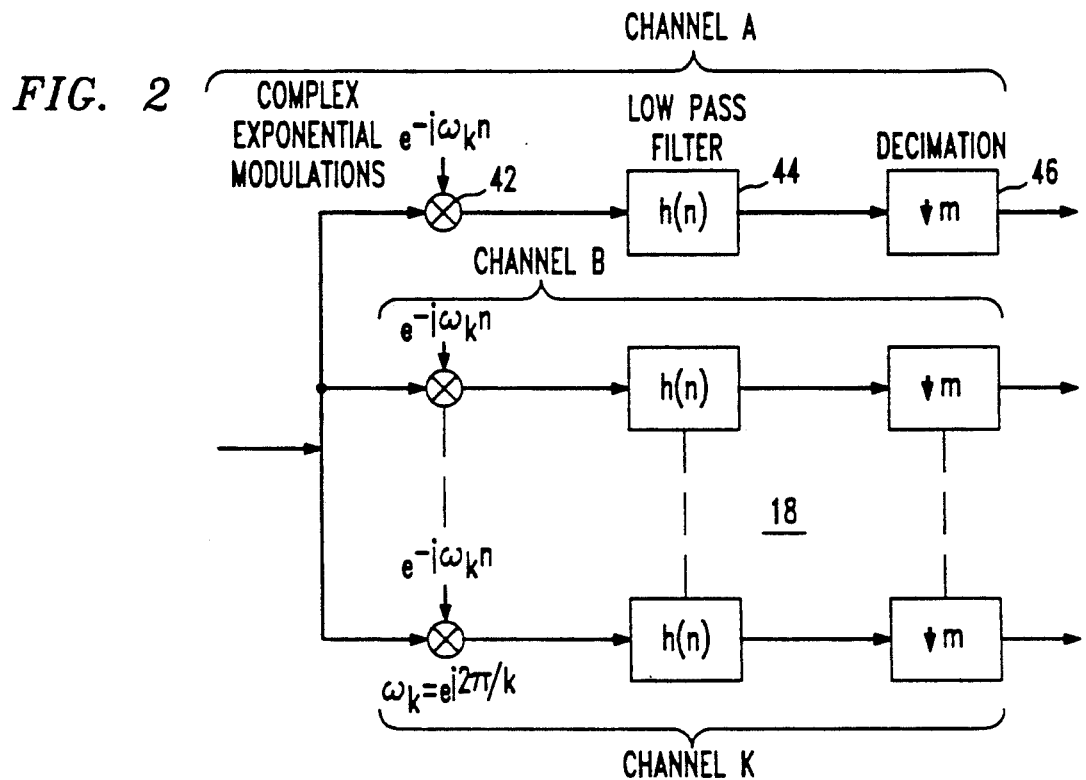
FIG. 2 block schematic diagram of a filter bank analyzer comprising a part of the base station of FIG. 1.

Referring to FIG. 2, there is shown a block schematic diagram of a symbolic representation of the filter bank analyzer 18 of FIG. 1. As shown in FIG. 2, the filter bank analyzer 18 is comprised of K separate channels 1,2...K. Each channel includes a complex modulator 42 which serves to exponentially modulate the real and quadrature phase signal components supplied to the filter bank analyzer by the function $e^{-j\omega_k n}$ where:

$$\omega_k = 2\pi k/K, \quad k=1,2\ldots K-1 \tag{1}$$

By exponentially modulating the incoming signal in this fashion, each complex modulator 42 serves to shift a separate one of the K channels of originally received signal to its original spectral position.

Each of the K channels of the filter bank analyzer 36 of FIG. 2 also includes a low-pass filter 44 for low-pass filtering the output signal of the modulator 42. A decimator 46 serves to decimate the output signal of the low-pass filter 44 by a factor of M, where M is a constant, so that the output signal of the decimator, representing a separate one of the K channels of the original frequency-multiplexed signal, is returned to its original sampling rate.

In practice, the frequency bank analyzer 18 is typically not implemented by means of separate discrete components, but rather, the analyzer is comprised of a digital signal processor (not shown) which is programmed to carry out the steps of (a) exponential modulation, (b) low-pass filtering, and (c) decimation using fast Fourier transform techniques as are described at pages 289-310 of the text *Multirate Digital Signal Processing* by Ronald E. Crochiere and Lawrence R. Rabiner (Prentice Hall, 1983), herein incorporated by reference. To compensate for the fact that the signals input to the filter bank analyzer 18 were originally obtained from analog signals of a continuous nature, the analyzer typically weights the signals, using an empirically established weighting factor, prior to processing.

Figure 3:
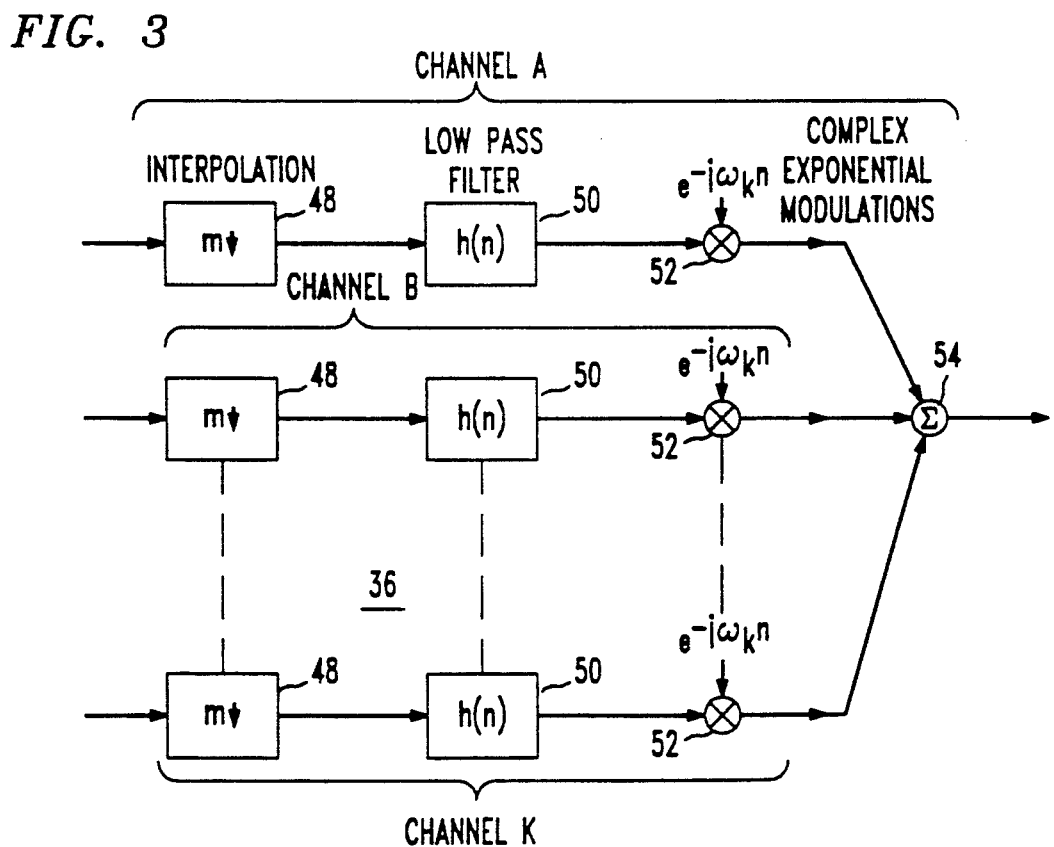
FIG. 3 is a block schematic of a filter bank synthesizer comprising a part of the base station of FIG. 1.

Referring now to FIG. 3, there is shown a block schematic diagram of a symbolic representation of the filter bank synthesizer 36 of FIG. 1. As seen in FIG. 3, the filter bank synthesizer is comprised of K individual channels 1,2,3 ... K. Each channel includes an interpolator 48 for interpolating a signal received from a corresponding modulator 34 of FIG. 1 by the factor of M. The output signal of the interpolator 48 of the channel is low-pass filtered by a low-pass filter 50 before being input to a complex modulator 52 which serves modulate the low-pass filtered signal by $e^{-j\omega_k n}$ where $\omega_k$ is given in eq. 1. The output signal of the complex modulator 52 of each channel is summed by a summing amplifier 54 to yield a frequency-multiplexed signal comprised of K individual channels.

As with the frequency bank analyzer 18 of FIG. 2, the frequency bank synthesizer 36 of FIG. 3 is implemented in terms of a digital signal processor (not shown) programmed to perform the steps of (1) interpolation, (2) low-pass filtering, and (3) complex modulation using inverse fast Fourier transform techniques. For a further description of how such steps may be carried out using inverse fast Fourier techniques, reference should be had to the aforementioned text *Multirate Digital Signal Processing* by Ronald E. Crochiere and Lawrence R. Rabiner incorporated by reference herein.

The foregoing describes a cellular telephone cell site base station 10 which advantageously utilizes a single transmitter 40 and a single receiver 14 for transmitting and receiving, respectively, a frequency-multiplexed signal containing K separate channels, each channel representing a signal associated with a separate mobile terminal. By frequency multiplexing and de-multiplexing K separate channels using the filter bank synthesizer 36 and filter bank analyzer 18, respectively, the need for multiple transmitter-receiver pairs is obviated, thereby achieving a savings in terms of both cost and space.

It is to be understood that the above-described embodiments are merely illustrative of the principles of the invention. Various modifications and changes may be made thereto by those skilled in the art which will embody the principles of the invention and fall within the spirit and scope thereof.

I claim:

1. A radio transceiver system comprising:
    a receiver for receiving a frequency-multiplexed signal containing K individual channels, where K is a positive integer, and for generating output signals indicative of the received signal;
    first signal-processing means for processing the output signals of the receiver to separate each of the K channels in the originally-received frequency-multiplexed signal;
    a plurality of K demodulators, each demodulating a separate one of the K channels separated by the first signal-processing means;
    a first plurality of K data and speech-processing circuits, each serving to process the demodulated channel produced by a separate demodulator in accordance with the manner in which the channel was demodulated to yield a separate one of K incoming voice/data signals;
    a second plurality of K data and speech-processing circuits, each processing a separate one of K outgoing voice/data signals in a predetermined manner;
    a plurality of K modulators, each modulating a separate one of the K outgoing voice/data signals in a particular manner in accordance with the way in which such signals were processed by a corresponding one of the second speech and data circuits;
    second signal-processing means for multiplexing the output signals of the K modulators to yield a frequency-multiplexed signal having K channels; and
    a transmitter for transmitting the frequency-multiplexed signal generated by the second signal-processing means.

2. The apparatus according to claim 1 wherein the first signal processing means comprises:
    analog-to-digital conversion means for converting the receiver output signals to digital signals; and
    filter bank analyzer means for (1) exponentially modulating, (2) low-pass filtering, and (3) decimating the digitized receiver output signals to demultiplex the originally received signal to yield K separate channels.

3. The apparatus according to claim 1 wherein each demodulator is an FM demodulator.

4. The apparatus according to claim 3 wherein each first data and data processing circuit comprises a digital signal processor programmed to processes the output signal of each demodulator by (1) high-pass filtering, (2) decimation with low-pass filtering, (3) expansion, and (4) de-emphasis.

5. The apparatus according to claim 1 wherein each demodulator comprises a TDMA demodulator.

6. The apparatus according to claim 3 wherein each first data and speech-processing circuit comprises a digital signal processor programmed to speech decode and then channel decode the output signal of a corresponding demodulator.

7. The apparatus according to claim 1 wherein the second signal-processing means comprises:
    filter bank synthesizer means for frequency-multiplexing the K modulator output signals by (1) separately interpolating each signal, (2) low-pass filtering each signal, (3) exponentially modulating each low-pass signal to a higher frequency band, and (4) summing the individually exponentially modulated signals to obtain a complex K channel frequency-multiplex signal; and digital-to-analog conversion means for converting the filter bank synthesizer output signal to an analog signal.

8. The apparatus according to claim 1 wherein each modulator is an FM modulator.

9. The apparatus according to claim 8 wherein each second data and speech-processing circuit comprises a digital signal processor programmed to process a signal for input to the modulator by: (1) high-pass filtering, (2) compression, (3) pre-emphasis, (4) limiting the signal, and (5) interpolating and low pass filtering the signal.

10. The apparatus according to claim 1 wherein each modulator serves to TDMA modulate the signal supplied thereto.

11. The apparatus according to claim 10 wherein each second data and speech-processing circuit comprises a digital signal processor for speech coding and channel coding a signal for input to a corresponding modulator.

12. A method for processing an incoming modulated, frequency-multiplexed K-channel signal, where K is a positive integer, containing K voice and/or data signal portions to separate the K signal portions into discrete signals comprising the steps of:
  receiving the incoming K-channel signal and generating a pair of signals indicative of the in-phase and quadrature phase components thereof;
  converting each of the signals to digitized signals;
  exponentially modulating each of the digitized signals to yield K separate discrete signals;
  low-pass filtering each of the K discrete signals;
  decimating each of the K discrete signals;
  demodulating each of the K discrete signals; and
  processing each of the K discrete signals in accordance with the manner in which the signal portions were demodulated.

13. The method according to claim 12 wherein each of the K discrete signals is frequency-demodulated.

14. The method according to claim 12 wherein each of the K discrete signals is TDMA demodulated.

15. A method for combining K outgoing voice and/or data signals to yield a modulated, frequency-multiplexed, K-channel signal, where K is a positive integer, comprising the steps of:
  processing each of the K incoming signals in accordance with how such signals are to be subsequently modulated;
  modulating each of the processed K incoming signals;
  interpolating each of the modulated K incoming signals;
  low-pass filtering each of the K interpolated signals;
  complex-modulating each of the K low-pass-filtered signals; and
  summing the complex-modulated signals to yield the frequency-multiplexed K-channel signal.

16. The method according to claim 15 wherein each of the K incoming signals is frequency modulated.

17. The method according to claim 15 wherein each of the incoming signals is TDMA modulated.

* * * * *